Figure 1:
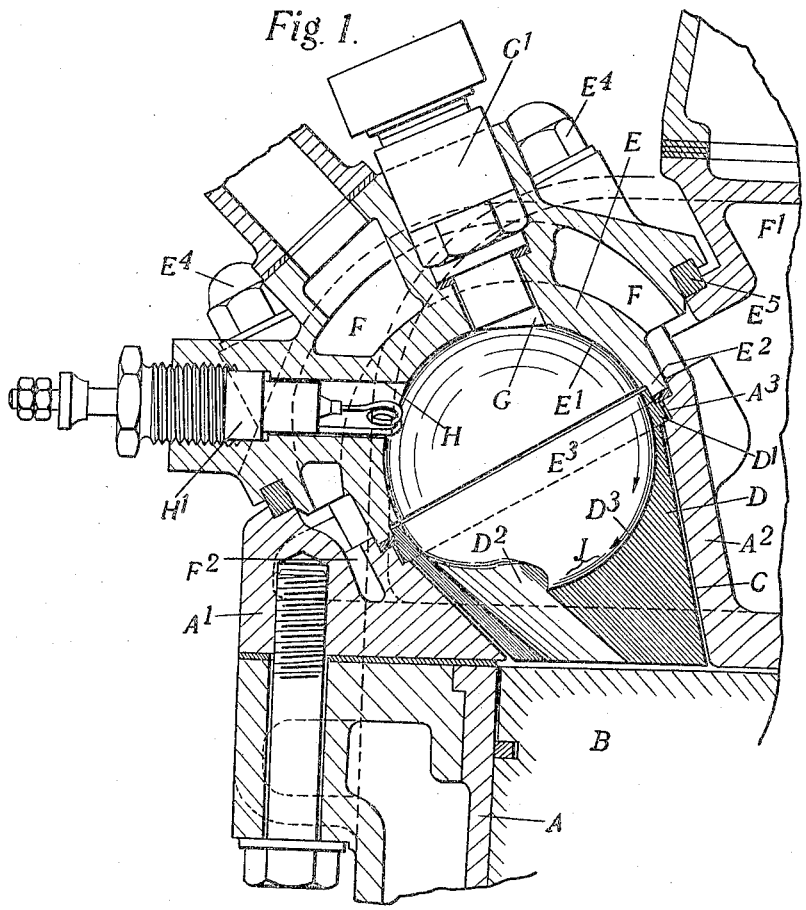

June 14, 1938.  H. R. RICARDO  2,120,768
COMBUSTION CHAMBER OF INTERNAL COMBUSTION ENGINES
OF THE COMPRESSION IGNITION TYPE
Filed May 25, 1936

Inventor
Harry Ralph Ricardo

Patented June 14, 1938

2,120,768

UNITED STATES PATENT OFFICE 2,120,768

COMBUSTION CHAMBER OF INTERNAL COMBUSTION ENGINES OF THE COMPRESSION IGNITION TYPE

Harry Ralph Ricardo, London, England

Application May 25, 1936, Serial No. 81,777
In Great Britain May 30, 1935

1 Claim. (Cl. 123—32)

This invention relates to the cylinders of internal combustion engines employing liquid fuel injection with compression ignition, and more especially to the formation and disposition of cell-like combustion chambers external to the cylinder.

The invention relates particularly to an engine of this general class in which there is a combustion chamber external to the cylinder formed as a cooled pocket in whose mouth, which opens into the end of the cylinder, is a pluglike member of substantial thickness mounted so that the heat flow therefrom to the parts surrounding it is restricted, that is to say, there is no free flow of heat from the plug member. Through this plug there is a passageway so formed and arranged that at the end of the compression stroke the air charge which is then forced into the combustion chamber will rotate or circulate in an organized manner within that chamber.

An engine embodying these features is described, for example, in the specification of the present inventor's U. S. Patent No. 2,003,311. In such an engine difficulty tends to arise in the construction and arrangement of the external combustion chamber, more especially where the head of the cylinder is detachable, when it is not convenient or desirable that the opening or mouth of the combustion chamber, as formed in the cylinder head, shall extend beyond or only slightly beyond the contour of the cylinder bore. Such a condition arises when a wet liner is employed. In such cases it is desirable that the opening in the cylinder head shall not extend over the top edge of the liner owing to the difficulty of making a satisfactory joint between the top of the liner and the cylinder block if these parts are at this point exposed to gases at high temperature and pressure. The object of the present invention is to overcome this difficulty and provide a construction in which the mouth of the combustion chamber will lie wholly either within the contour of the cylinder bore or within the circle which defines the outside of the flange of the cylinder liner.

According to this invention a conical passage is formed in the head and this terminates at its smaller end in an opening into the bore of the cylinder, this opening lying either within the contour of the cylinder bore or wholly within the circle which defines the exterior of the cylinder liner. A plug formed of suitable material with a passageway extending through it is provided this plug having a conical form externally to correspond to the shape of the passage through the head, in which passage the plug lies so as to be heat-insulated and also held against rotation. A hollow cap-like member fits and is fixed on to the outer or larger end of the conical passage in the head, this cap with the adjacent end part of the plug forming between them a combustion chamber cell which lies outside of but is in communication with the cylinder by way of the passageway through the plug.

The part of the head in which is formed the conical passage is arranged to be cooled by liquid, for example water, or by air. The cap-like member is also constructed and arranged so as to be cooled by fluid or air. The inter-engagement of the margin of the cap-like member with the part of the head surrounding the larger end of the passage through the head may be effected in various ways by suitable construction of these parts. Conveniently, however where these parts interengage or abut, the cap is formed so that it also engages the end of the plug and thus serves to hold the latter against movement in the direction of its axis. The outer part of the cap-like member, that is to say, the part which lies more remote from the end of the cylinder, is suitably flanged or otherwise shaped to permit of its being held in place by bolts or studs. Alternatively, the cap member may be fixed in place by the engagement of screwthreads on a suitably formed part bearing on the cap member and engaging threads in the cylinder head. In this part of the cap is formed a socket or opening adapted to receive a fuel injector nozzle. A second opening may be provided to receive a heater plug.

A construction embodying one form of the invention is illustrated by way of example in the accompanying drawing, in which—

Figure 2:
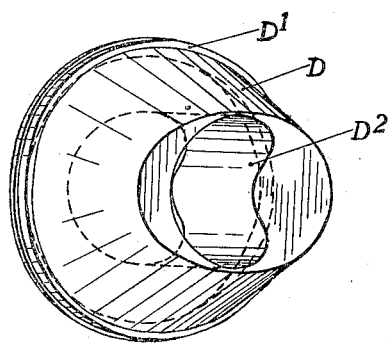

Figure 1 is a vertical section through the upper part of the cylinder and through the cell-like combustion chamber, and Figure 2 illustrates the conical plug in perspective.

In the construction shown the cylinder A containing the piston B is furnished with a detachable head $A^1$. Formed in a part $A^2$ of the head $A^1$ is a conical passage C of appreciable length, the smaller end of the passage C opening into the cylinder so that the orifice at the smaller end of this passage lies wholly within the bore of the cylinder but to one side of the axis thereof as shown. The central axis of the conical passage is inclined at an appreciable angle, say, 30° to the longitudinal axis of the cylinder. By thus disposing the conical passage C to one side of and inclined to the cylinder axis, the said passage and the part $A^2$ of the cylinder head $A^1$ in which the passage is formed can be arranged to be clear of the passages in the head A which lead to the inlet and exhaust ports (not shown).

Lying within the conical passage C is a plug member D formed of suitable material, say, heat-resisting metal of low conductivity, and having a conical exterior form corresponding to the conicity of the passage C. The end of larger diameter of the plug D is furnished with an annular enlargement D¹ which lies within an annular recess A³ at the outer or larger end of the conical passage C. The arrangement is such that when the plug D is in place with the annular enlargement D¹ lying in the recess A³, the plug D will be supported in the passage C so that there will be a slight clearance, as shown in Figure 1, between the exterior of the plug D and the internal surface of the conical passage C. Free flow of heat from the plug D to the surrounding part A² and other parts of the head A is thus prevented. The plug D is held in the desired position against rotation about its axis by a pin or setscrew (not shown) projecting from the wall A² into a recess in the external surface of the plug D.

The plug D has a bore or passageway D² the cross-sectional shape of one form of which is clearly illustrated in Figure 2, the outer or larger end of the plug being dished or hollowed out, as shown at D³ in Figure 1. The corresponding end of the conical passage C is closed by a cap-like member E having a substantially hemispherical inner surface E¹, a margin or rim E² of this cap bearing against an annular packing member E³ the inner part of which lies against the annular enlargement A³ of the plug D whilst the outer part of the packing member engages an annular recess in the part A² of the cylinder head A. Thus, when the cap E is secured in place by retaining bolts E⁴, the cap retains the plug D firmly in position, a substantially spherical combustion chamber being formed by the hemispherical part E¹ of the cap E in cooperation with the hollowed out part D³ at the inner end of the plug D.

The cap-like member E is furnished with an integral flange through which pass the bolts E⁴ securing the member E to the head A¹, an annular packing member E⁵ being thus compressed to form a liquid-tight joint between the member E and the cylinder head A¹. The member E is provided with passages F communicating with the cooling jacket F¹ of the cylinder head, this jacket being extended as shown at F² so that cooling water flows not only around the hemispherical portion of the cap member E but also around the part A² adjacent to the plug D.

The member E has a socket G opening into the spherical combustion chamber and formed to receive a fuel injection device G¹. The member E has a second socket H opening into the said spherical combustion chamber and dimensioned to receive a heater plug H¹.

The disposition of the passageway D² with respect to the internal contour of the spherical combustion chamber or cell formed by the part-spherical surfaces E¹, D³ is such that the gaseous charge which during the compression stroke of the piston B is forced from the engine cylinder through the passageway D² into the said spherical combustion chamber, will enter the latter in a manner and in a direction, for example tangentially, which will tend to cause rotation of this gaseous charge in the combustion chamber or cell. The fuel jet from the device G¹ is so directed that the axis of the jet will meet a part of the hollowed out surface D³ of the plug D at a place, say as indicated at J, over which will sweep the rotating gases as they travel downwards, as indicated by the arrows in Figure 1, i. e. after passing the injection device G¹ and a short distance before they come to the orifice at the inner or larger end of the passageway D².

It will be understood that the construction above described is given by way of example only and that details may be modified. Thus, the combustion chamber or cell may be otherwise than spherical, with its contour a figure of revolution and the passageway through the plug leading tangentially thereinto. Again the passageway through the plug may in some cases be parallel sided and its cross-section may be circular, elongated or approximately rectangular. Further, the cap-like member, instead of being bolted to the cylinder, may be held in place by an externally screwthreaded member pressing on the cap and engaging a correspondingly screwthreaded socket in the cylinder head. The invention may be employed either in conjunction with a detachable cylinder head or with one formed integral with the engine cylinder, the cylinder head being either water-cooled or air-cooled. The invention is also applicable to combustion chamber arrangements of the type forming the subject of U. S. application Serial No. 24,145.

In addition to attaining the object set out above the construction and arrangement embodied in the present invention has the advantage of simplicity of construction, more especially that it is easy to form and machine the passage in the head and the plug which fits therein. Further, owing to the fact that the bulk of the chamber lies away from the centre line of the cylinder, the provision of waterways round the chamber and between the chamber and the valves is facilitated. In the case of air-cooled engines the provision of cooling air passages is also made easier by the construction described. Moreover, the manner of assembling the parts associated with the combustion chamber is simple and enables a satisfactory fluid-tight joint to be obtained while facilitating the removal and replacement of the outer portion of the combustion chamber and the accessories carried thereon.

What I claim is:

In an internal combustion engine of the liquid fuel injection compression ignition type, a cylinder block, a cylinder bore therein, a wet or water cooled liner set in said cylinder bore; a cylinder head having a conical passage formed therein which terminates at its smaller end in an opening into the bore of the cylinder, said opening lying wholly within the contour of the cylinder liner and thus spaced from the joint between the liner and the cylinder block, said joint being covered by said cylinder head; an externally conical plug situated within said passage so as to be heat-insulated and held against rotation, the smaller end of said plug extending substantially to the plane of the upper end of the cylinder bore, said plug being provided with a passageway; a hollow, cap-like member which fits and is fixed on to the outer end of the said conical passage, the said cap with the adjacent end part of the said plug forming between them a combustion chamber communicating with the cylinder by means of the passageway through the said plug in such manner that at the end of the compression stroke the air charge is caused to rotate in an organized manner within said chamber; and a fuel injection device situated within said chamber.

HARRY RALPH RICARDO.